April 5, 1966　　　R. C. MIERENDORF　　　3,244,956
POSITION CONTROL SYSTEM

Original Filed Sept. 24, 1959　　　　　　　3 Sheets-Sheet 1

INVENTOR.
ROBERT C. MIERENDORF
BY
William H. Schmeling

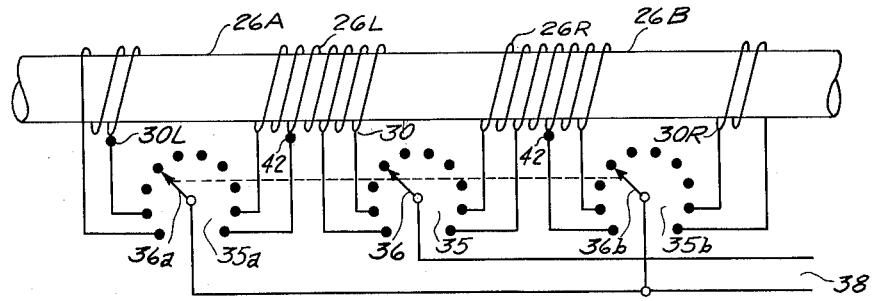
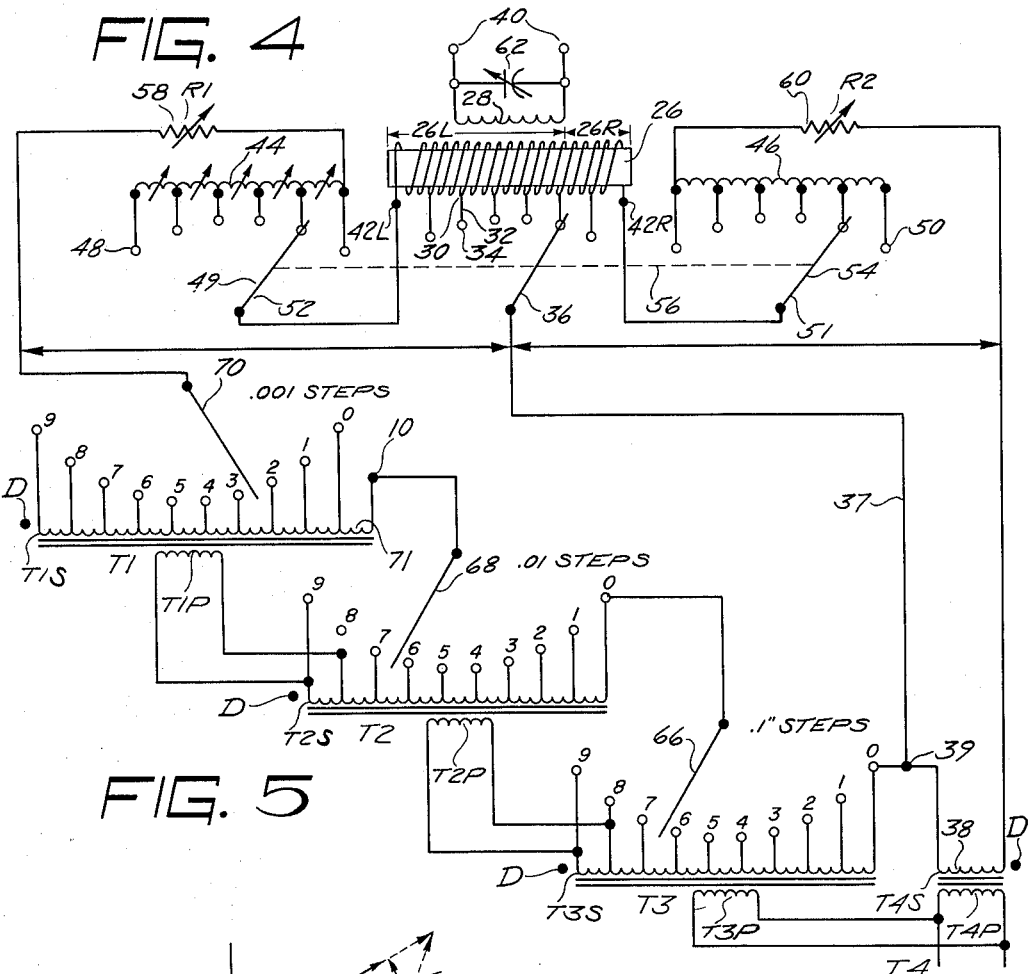
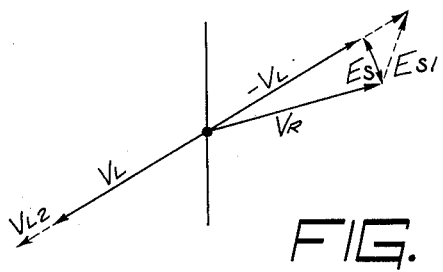

April 5, 1966 R. C. MIERENDORF 3,244,956
POSITION CONTROL SYSTEM
Original Filed Sept. 24, 1959 3 Sheets-Sheet 3
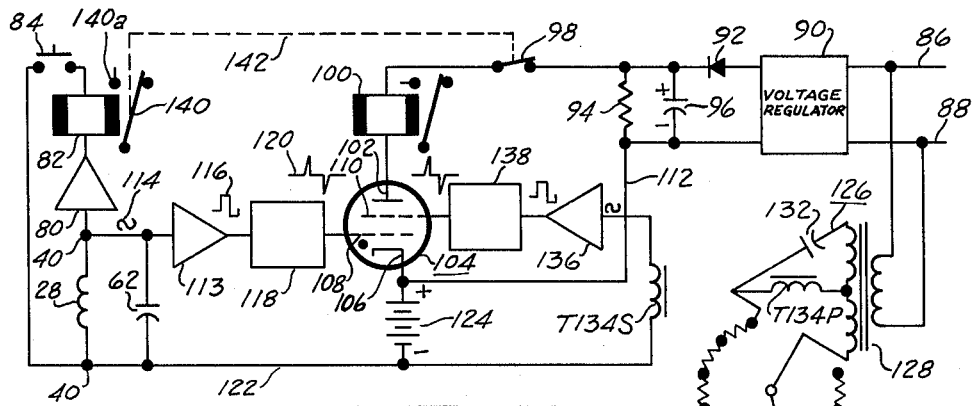
FIG. 7
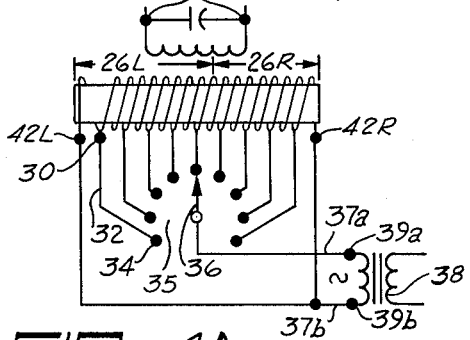
FIG. 4A
FIG. 4B
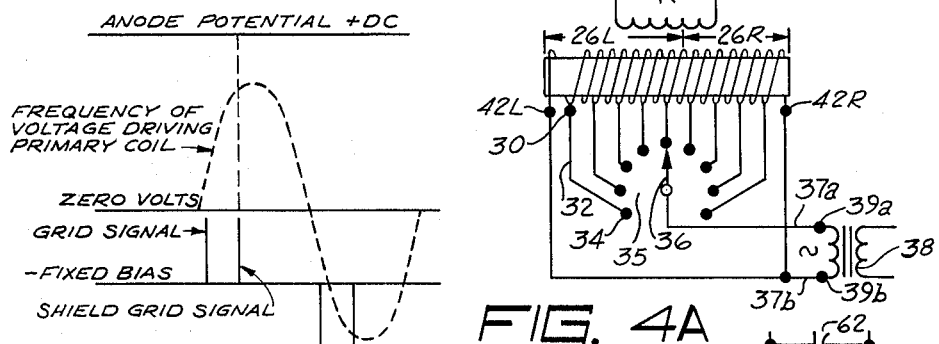
FIG. 8
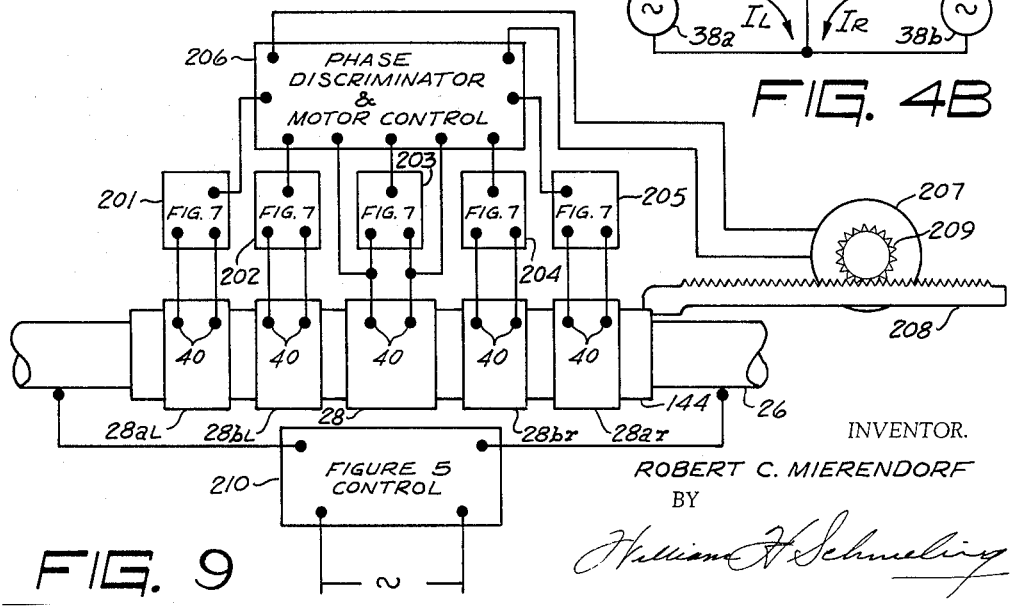
FIG. 9
INVENTOR.
ROBERT C. MIERENDORF
BY
William H. Schmeling United States Patent Office 3,244,956
Patented Apr. 5, 1966

3,244,956
POSITION CONTROL SYSTEM
Robert C. Mierendorf, Wauwatosa, Wis., assignor to Square D Company, Park Ridge, Ill., a corporation of Michigan
Continuation of application Ser. No. 842,001, Sept. 24, 1959. This application Feb. 7, 1963, Ser. No. 256,975
19 Claims. (Cl. 318—18)

This invention relates to position control and is more particularly concerned with a system for precisely indicating the relative positions of two relatively movable members and is a continuation of application S.N. 842,001, filed September 24, 1959, now abandoned.

The present invention is basically concerned with an apparatus and system which will indicate the relative position of a member relative to a reference and is particularly suited for use with various production machines, such as conveyors, gages and the like, where it frequently is necessary to determine when two relatively movable members are in a precise, predetermined position relative to each other. For example, a single vertical-spindle drilling machine may be used for drilling holes in flat plates. When these machines are used, the centers of the holes to be drilled must be precisely located. Heretofore, the positioning of the machine to accomplish the above has been accomplished visually with a scale that included a vernier. Unfortunately, the use of such optical scales, and particularly the verniers thereof, requires considerable time and visual skill.

The measuring system according to the present invention will determine the relative position of a member in a predetermined path of travel whether the path of travel be a straight or curved line, and to that extent, the system may be construed as measuring linearly. Further, the system is noncyclic, because it will continuously indicate the direction of displacement of a member from a predetermined point. Further, the system is static in nature, because it may be constructed without moving contacts or other wearing parts, and is flexible since it is adapted for use with a wide variety of industrial machines and other equipment.

The present invention is directed to certain improvements in a basic control system which includes an elongated primary winding hereinafter called primary which is energized from a single phase source of alternating current. The wire convolutions of the primary are preferably wound on a support of nonferrous material and is provided with a pair of input terminals adjacent its end. Located at spaced predetermined intervals, e.g., one inch intervals, along the primary coil between the input terminals, are spaced taps which in turn are connected to a selector switch. When both of the input terminals of the primary are connected to one of the terminals of a single phase alternating current source and any one of the taps is connected through the selector switch to the other terminal of the source, then alternating current will flow in opposite directions in the two sections of the primary coil defined by the terminals at the ends of the coil and the selected tap. When the current thus flows through the sections, the voltage in the sections will be 180° out of phase from each other and the current flow in the sections will be in opposite directions.

The basic control system also includes a secondary coil which is mounted so that the primary and secondary are relatively movable. The secondary is inductively coupled with the primary coil and is provided with a pair of output terminals across which the voltage induced in the secondary by the primary coil will be impressed.

It has been previously stated that current flows in opposite directions in the sections of the primary which extend in opposite directions from the selected tap. Thus, theoretically, if the secondary is centered at the selected tap, then the voltages induced therein by the turns of the primary coil extending respectively in opposite directions of the selected tap are equal and opposite and the output of the secondary will be zero. When the secondary is displaced from its centered position, the section of the primary toward which the secondary is displaced will have its inductive coupling increased while the section of the primary from which the secondary was displaced would have its coupling decreased. When the secondary is thus displaced, the voltages induced therein by the respective primary sections will no longer be equal and opposite and a resultant voltage will appear at the output terminals of the secondary, the phase of which indicates the direction of the displacement.

It has been discovered that an absolute null voltage output of the secondary coil is not realized when the secondary coil is accurately positioned over the selected tap for minimum output. Further, it was observed that the voltages induced in the secondary coil are not symmetrical and a minimum secondary output signal continuously exists which varies in phase and amplitude as the various taps on the primary coil are selected. Further, in the basic system, wave form distortions or harmonics were introduced in the secondary output from the primary coil and from other sources.

In the basic system, a multitap secondary winding was used to position the secondary at selected points between the spaced taps on the primary. Further, the basic system required that either the primary or secondary coils be physically displaced by a micrometer vernier adjustment to provide the zero offset for the apparatus. This feature was added so that the apparatus would be calibrated to the machine to which it was attached, or when a part was positioned on the machine, so that the measuring system could be displaced to compensate for displacements of the part on the machine. In the present invention, the accurate positioning of the secondary at points intermediate the taps on the primary is accomplished electrically without requiring a multitap secondary and the zero offset of the system is also accomplished electrically without mechanical devices. Further, in the system according to the present invention, additional secondary coils permit the use of a slow down circuit. A slow down circuit will provide a warning signal before the secondary coil and selected tap are in proper position and will permit the machine to which the primary and secondary coils are attached to traverse at high speed when the distances between the secondary coil and the selected point is great, but at a relatively slow speed to accurately position the secondary as the secondary approaches close to the final selected point.

It is an object therefore of the present invention to provide a position indicating system which will incorporate the features above discussed.

Another object of the present invention is to provide a position indicating system which includes an elongated primary winding and a secondary winding which is axially movable relative to the primary winding and inductively coupled thereto to have an alternating voltage induced therein from the primary and to provide the primary winding with selectable spaced taps which are located between the end terminals on the primary thereby dividing the primary into two sections of varying predetermined lengths which sections will have variable inductance and resistance ratios depending on which tap is selected, with an impedance means which includes an inductance which is arranged to equalize the impedance of said sections to maintain the voltages induced in the secondary by the respective sections symmetrical.

A further object of the present invention is to provide a position indicating system which includes a multitap primary winding and a secondary winding which is inductively or magnetically coupled thereto with a means which will equalize the impedance across the two sections of the primary, said sections being defined as the portions of the primary which extend in opposite directions from any one of the taps of the primary and the terminals adjacent the ends of the primary with a means which will selectively vary the voltage across one of the sections in discreet steps relative to the voltage across the other section, whereby the voltage induced by the respective sections in the secondary will be selectively varied.

Another object of the present invention is to provide the positioning indicating system described in the foregoing objects with a means which will be responsive to the output of the secondary coil to provide a control function.

A still further object of the present invention is to provide the position indicating system described in the foregoing objects with a means which is responsive to the phase angle of the output voltage of the secondary winding and a means connected with said means for selectively varying the phase angle of the secondary output voltage to which the means responds.

Another object of the present invention is to provide the position indicating system described in the foregoing objects with an additional secondary coil which is inductively coupled with the primary coil and spaced at a predetermined distance axially along the primary coil from the main secondary coil, which additional secondary coil will provide a separate control function.

It is still another object of the present invention to provide a position indicating system which includes a multitap primary coil and a secondary coil which is inductively coupled and movable axially relative to the primary coil with a means which will maintain the inductance across the two sections of the primary coil equal, regardless of which tap is selected, a means for selectively varying the voltage across one of the sections of the primary coil relative to the other, a means which will increase the output voltage induced in the secondary while suppressing voltages of spurious frequencies induced therein from foreign sources, a means connected to the secondary which is responsive to a predetermined phase angle of the voltage induced in the secondary which means includes a means for varying the phase angle to which the means will respond, and an additional secondary coil which is inductively coupled with and axially movable relative to the primary coil and spaced from the first mentioned secondary which additional secondary will exercise a separate control function.

Another object of the present invention is to include in the system described in the foregoing objects a means connected in the output circuit of the secondary coil which will increase the voltage induced in the secondary by the primary coil while suppressing the voltages of spurious frequencies induced in the secondary from foreign sources.

Further objects and features of the invention will be readily apparent to those skilled in the art from the specification and appended drawings illustrating certain preferred embodiments in which:

FIG. 4 is a schematic wiring diagram showing the electrical principles of one of the features of the present invention.

FIG. 4A is a schematic wiring diagram illustrating the basic primary and secondary arrangements as used with the present invention.

FIG. 4B is a schematic wiring diagram illustrating improvements in the system shown in FIG. 4A.

FIG. 5 is a schematic wiring diagram showing additional features of the present invention as incorporated with the system shown in FIG. 4.

FIG. 6 is a vector diagram illustrating the voltages induced in the secondary coil shown in FIG. 4.

FIG. 7 is a schematic wiring diagram of a phase discriminating circuit which may be used with the secondary coil shown in FIG. 4.

FIG. 8 diagrammatically illustrates the phase angle relations of the voltages impressed on the anode and the two control electrodes of the electronic switch shown in FIG. 7.

Figure 1:
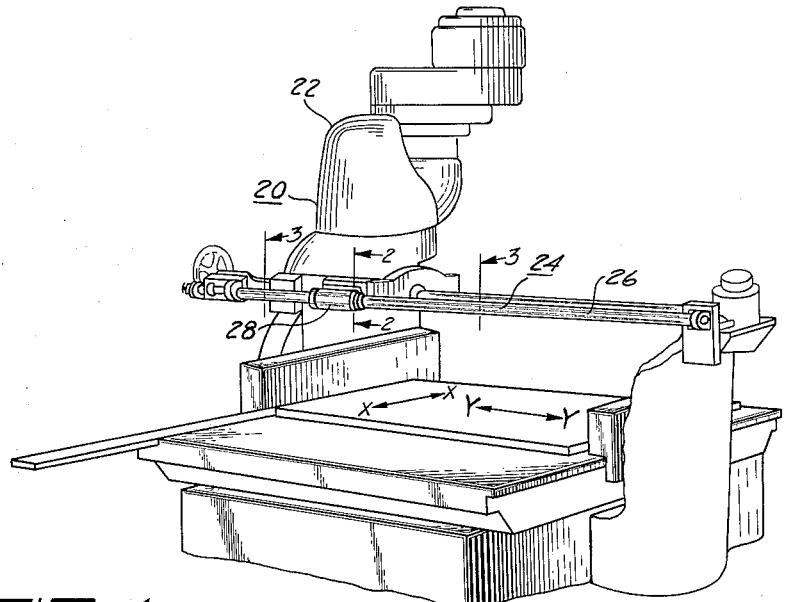
FIG. 1 is a perspective view of a vertical drilling machine to which the present invention may be applied.

FIG. 9 diagrammatically illustrates an arrangement whereby additional secondary coils may be used with the apparatus shown in FIG. 1 to achieve additional control functions.

Referring now to the drawings, and to FIG. 1 particularly, there will be seen a single vertical-spindle drilling machine of the type well known in the art, indicated by the numeral 20. The drilling machine includes a spindle head 22 mounted on a crossrail, and movable in the direction marked Y—Y. The spindle head 22 preferably is movable by means of a lead screw (not shown), but also could be moved by suitable hydraulic means. The machine 20 further has a worktable to which work pieces may be secured by suitable means, such as screws, two clamps, etc., not shown. The worktable is movable in the direction indicated as X—X in FIG. 1, and may be moved by a lead screw driven by an electric motor or other suitable driving means, such as hydraulic means. The specific structure for effecting the movement in the X—X and Y—Y directions is not shown since this is well known in the art. In the conventional construction of the machine, each slide motion is provided with a scale for vernier reading to thousandths of an inch. Accordingly, the spindle centerline can be positioned to any desired location over the worktable and, hence, over the surface of the work piece by setting of the X and Y dimensions on the respective scales.

Such positioning by scale reading is time consuming, and, to some extent, difficult. It is necessary for the operator to position himself next to the location of the scale and then to "sort out" the inch marks visually. The operator must further read the tenths, hundredths and vernier marks. Accordingly, as set forth immediately hereinafter, the machine has been modified to incorporate the electrical measuring or positioning device according to the present invention. The devices for measuring or positioning in the Y—Y direction are shown and hereinafter described. It will be understood that the devices are duplicated for positioning in the X—X direction.

The position indicating device as used with the present invention is indicated by the numeral 24, comprising a primary winding 26 and one or more secondary windings, one of which is indicated by the numeral 28. The primary winding comprises a continuous wire 31 (FIGS. 2 and 3) which is wound to form a great many turns which are suitably supported and extend across the width of the machine 20, in FIG. 1. A support 29 for the convolutions of the primary as shown in FIG. 3, preferably is of nonferrous material, such as a polystyrene rod or aluminum tube. The materials selected for the support preferably will not sag with age and, if possible, will have a coefficient of expansion which approximates the materials of the machine to which the support is attached. This will minimize the effects of temperature variations in the positioning system. The support 29 is preferably an aluminum tube and is threaded with a helical groove over the length of travel of the machine 20. The wire 31 which forms the turns of the primary is wound in the threads to assure accurate positioning thereof. The primary 26, as shown in FIG. 3, is provided with a plurality of taps 30. These taps are located between terminals 42L and 42R (FIG. 4A) which are adjacent the ends of the primary coil 26. The drawing in FIG. 3 has been simplified. The taps 30 are typically positioned at every inch along the primary which is likely to be several feet in length. Thus the number of taps shown in FIG. 3 is illustrative, but not necessarily representative. Preferably, a slot is longitudinally milled in the tube to reduce the eddy current losses and to serve as an entrance for the wires which are connected between the taps 30 of the primary and a tap switch, which will be hereinafter described. In the most simplified form, as shown in FIG. 4A, the taps 30 are directly connected by means of wires 32 to respective fixed contacts 34 of a selector switch 35 having a movable contact 36. The movable contact 36 is connected by a lead 37a to one terminal 39a of an alternating current source 38. The end terminals 42L and 42R are connected through a suitable lead 37b to the other terminal 39b of the source 38. The source 38 comprises the usual 110 volt, single phase, 60 cycle power line although it has been found that advantages may be obtained if the system is operated at higher frequencies. Among the advantages which may be realized by the use of higher frequency is the release of the system from interferences of other electrical devices which are located in the vicinity of the machine on which the positioning control system according to the present invention is mounted.

Figure 2:
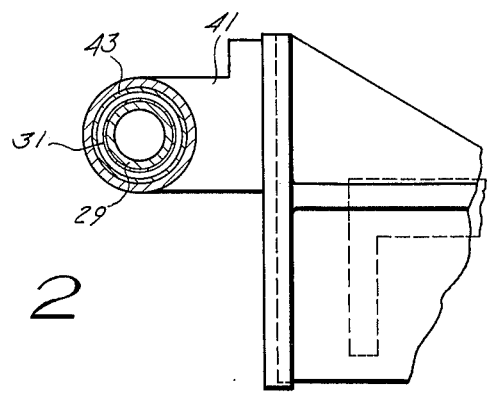
FIG. 2 is a vertical cross sectional view taken along line 2—2 in FIG. 1.
Figure 3:
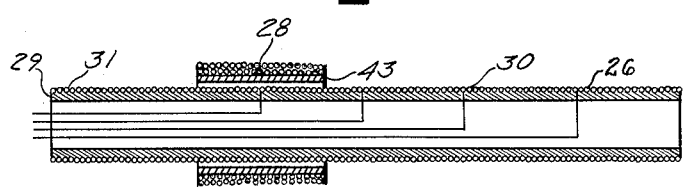
FIG. 3 is a longitudinal cross sectional view taken along line 3—3 in FIG. 1.

The apparatus shown in FIGS. 1, 2 and 3 also includes a secondary coil 28, which, in the preferred embodiment of the present invention, is mounted by a support 41 on the machine 20 so the secondary coil 28 is co-axial to the primary coil 26 and is axially movable along the primary coil 26 without physical contact therewith. The secondary coil 28 is wound on a bobbin 43 and has a plurality of turns which are inductively coupled to the primary. The ends of the secondary are connected to a pair of output terminals 40 (FIG. 4).

It will be seen that selective activation of the taps 30 on the primary coil 26 effectively divides the primary coil 26 into a plurality of pairs of sections of varying lengths depending on the position of the movable contact 36. Thus, if the movable contact 36 is in the position shown in FIG. 4A, the portion of the primary 26 extending to the left of the tap selected to the terminal 42L will provide one of the sections 26L and the portion of the primary extending to the right of the selected tap to the terminal 42R will provide the other section 26R. Further, it will be seen that as the movable contact 36 of the selector switch 35 is moved counterclockwise, the length of section 26L will decrease and the length of section 26R will increase incrementally as the contact 36 completes the circuits to the various taps 30. A clockwise rotation of the contact 36 will increase the length of the section 26L and decrease the length of the section 26R correspondingly. However, for each position of the selector switch 35, a pair of sections comprising sections 26L and 26R will exist. Thus, as the movable contact 36 is moved to select the various taps 30, a plurality of sections of varying predetermined lengths will be provided.

It will be seen that in FIG. 4A the primary terminals 42L and 42R and the selectable taps 30 are connected to a single source of alternating current 38. If desired, the individual sections 26L and 26R can be connected to individual sources of alternating current 38a and 38b as diagrammatically shown in FIG. 4B, wherein the terminal 42L is connected through a variable resistor R1 to one terminal of a source 38a and the terminal 42R is connected through a variable resistor R2 to the one terminal of a source 38b. The tap 30 in FIG. 4B which may be considered as the tap selected by the movable contact 36, the remainder of the taps 30 on the primary not being shown in FIG. 4B for clarity purposes, is connected to the other terminals of the sources 38a and 38b. The pair of terminals 42L and 42R are thus connected to the separate single phase alternating current sources 38a and 38b so the voltage at the terminals 42L and 42R will be of like polarity and at any one instant will be opposite to the polarity at the selected tap 30. As previously indicated, a selected one of the taps 30 divides the primary into two sections, the lengths of which will vary depending upon which tap is selected. It will thus be apaprent that, since the selected tap 30 is connected to the sources 38a and 38b with the polarity at the selected tap 30 opposite to that of both terminals 42L and 42R, the current flowing through the selected tap 30 at all times will be equal the sum of the current flowing through the terminals 42L and 42R; or in effect, the current flow at the selected tap will divide through the two sections of the primary and the voltages in the respective sections of the primary will be 180° out of phase with each other. This is shown by the arrows $I_L$ and $I_R$ in FIG. 4B which indicate the direction of current flow during the cycle of the alternating current when the terminals 42L and 42R are positive relative to the selected tap 30. Further, it is apparent that if the secondary is inductively coupled to the primary then the voltage output of the secondary will be dependent upon the coupling between the primary and secondary, the field strength of the primary coil and the number of turns in the secondary coil. It has been observed, however, that the voltages induced in the secondary, even when the secondary was accurately positioned over a selected tap in the primary, were not symmetrical and that a minimum voltage signal continuously existed, which signal varied in amplitude and phase for the various settings of the secondary on different ones of the selected taps of the primary. It will be observed that as the different taps 30 are selected on the primary, the lengths of the various sections of the primary will vary. Thus the inductances of the sections will be unequal and will vary for the various taps 30 which are selected.

To explain this phenomenon, if it is assumed that the voltages of sources 38a and 38b are equal and are designated by $E_1$ and $E_2$ respectively, and the resistors R1 and R2 are of equal resistance, and if a tap 30 is selected so the inductances of sections 26L and 26R are equal, and the secondary coil 28 is properly centered over the selected tap 30, then the voltages induced in the secondary by the sections 26L and 26R theoretically will be equal and opposite in phase and the output of the secondary will be zero. However, as various other taps 30 are selected by the selector switch 35, the inductance of the sections 26L and 26R will vary and the current flow through the sections 26L and 26R which is designated by $I_L$ and $I_R$ will vary both in phase and magnitude. This will cause the voltages induced in the secondary coil 28 to be unsymmetrical and will result in a minimum signal $E_S$ which cannot be eliminated and which will not be constant because it will depend on the tap 30 selected by the movable contact 36.

The arrangement shown in FIG. 4 will overcome the above difficulty and provide a perfect null when the secondary is accurately positioned over the selected tap of the primary. In FIG. 4, the primary is shown as being three times as long as necessary and is divided into three sections of equal length. The center section is analogous to the primary shown in FIG. 4A and has its taps 30 selectively connected through the movable contact 36 to one of the terminals of the single phase alternating current source 38. The end sections 26A and 26B which are identical units, are provided with a plurality of taps 30L and 30R respectively, which are connected respectively through suitable selector switches 35a and 35b having respective movable contacts 36a and 36b to the other terminal of the source 38. The selector switches 35, 35a and 35b having movable contacts 36, 36a and 36b are mechanically interconnected and effectively shunt selected portions of the sections 26A and 26B. The switches are arranged so that as the center switch 35 is moved, the sum of the inductance to the right of the selected tap 30 will equal that to the left of the selected tap 30. The above has been given for illustrative purposes only, because it is to be appreciated that a primary coil three times the required length would not only be costly, but impractical. It has been found that the foregoing disadvantages can be overcome without sacrifice of the advantages achieved thereby by having the two end sections 26A and 26B lumped into individual tapped inductance units which can be remotely mounted and which are controlled by conventional ganged selector switches, as illustrated in FIG. 5.

In FIG. 5, the primary coil 26 is provided with a plurality of individual taps 30, as previously described, which taps are located between the end terminals 42L and 42R. Variable inductance elements 44 and 46, which replace sections 26A and 26B as in FIG. 4, have windings which are suitably tapped and connected respectively with the groups of fixed contacts 48 and 50 of suitable selector switches 49 and 51, having movable contacts 52 and 54, respectively. The terminal 42L is connected to the movable contact 52 and the terminal 42R is connected to the movable contact 54. The movable contacts 52, 54 and 36 are preferably mechanically interconnected, as shown by the dotted line 56, so that as contact 36 is moved from left to right to increase the inductance of the section 26L and correspondingly decrease the inductance of section 26R, the inductance of element 44 will decrease while the inductance of the element 46 will increase. The resistors 58 and 60 which may be adjustable are respectively connected between the elements 44 and 46 and respective terminals of the transformers T3 and T4 which are opposite in polarity to the common terminal of these transformers to which the movable contact 36 is connected. The resistors 58 and 60 are selected to have a relatively large value so the voltage drop thereacross greatly exceeds the small voltage drop across the inductors 44 and 46 and the primary 26. This will provide substantially a constant source of current through the sections 26L and 26R of the primary which are detected by the secondary 28.

As previously explained, the means which comprises the lumped inductance elements 44 and 46 are adjustable to maintain equal the inductances in the sections 26L and 26R of the primary and the resistors 58 and 60 are adjustable to maintain the resistances of the circuit of the sections 26L and 26R equal so the voltage induced in the secondary coil by the respective sections 26L and 26R will be symmertical when the secondary coil 28 is centered over any one of the taps 30. When the secondary coil 28 is displaced from the selected tap 30, a voltage $E_S$ will appear across its output terminals 40. If a capacitor 62 is connected across the output terminals and tuned to provide a parallel resonant tank circuit with the secondary coil, at the driving frequency of the source 38, the output signal $E_S$ will be increased in magnitude while the other voltages including harmonics of the primary voltages which may be included in the secondary by other spurious sources of different frequencies will be suppressed.

From the foregoing it is clear that with the resistances R1 and R2 of the resistors 58 and 60 equal, with the capacitor 62 properly tuned, and the inductors 44 and 46 providing equal total inductance in the respective sections 26L and 26R, then the currents $I_L$ and $I_R$ as is FIG. 4A will be equal in magnitude and the voltage $E_S$ of the secondary coil 28 will be zero when the secondary is centered over a primary tap 30. If the secondary circuit, as will be hereinafter expained, requires a definite minimum level of $E_S$ to operate, the result can be accomplished by adjusting either or both of the resistors R1 or R2. It is well known that, in a circuit containing an inductance and a resistance, a variation in the value of the resistance will cause a corresponding change in the phase angle of the current flowing in the circuit. Thus, as the values of R1 or R2 are changed, a change in the phase of the voltage $E_S$ will occur. However, when R1 and/or R2 are adjusted to provide a minimum voltage $E_S$, the phase and amplitude of the voltage $E_S$ will be constant for each of the primary coil taps which is selected by the movable contact 36. It has been determined that either the phase or amplitude of the voltage $E_S$ can be detected for indication of the position of the secondary winding 28 and it has been discovered that the changes in phase angle of the voltage $E_S$ are more pronounced than the change in amplitude of the voltage $E_S$ in the region of the tap 30 which is to be located, and the changes in amplitude of the voltage $E_S$ is more linear over a greater range from a selected tap position than the change in phase angle of the voltage $E_S$.

As pointed out in connection with the circuit shown in FIG. 4B, the magnitudes of the voltages E1 and E2 were selected so $E_1 = E_2$. Further, in connection with FIG. 5, the lumped inductors 44 and 46 are adjustable so the inductance of the circuits of 26L is equal to that of 26R. In the preceding paragraphs it was pointed out how an adjustment of the resistors R1 or R2 would provide a minimum output voltage $E_S$ when the secondary winding was properly positioned over one of the taps 30 selected by the movable selector switch contact 36. Thus the circuits to either the sections 26L or 26R have an impedance Z which is equal to $\sqrt{R^2 + X_L^2}$ where R is the resistance of the circuit and $X_L$ equals the inductance. Further, it is known that the current I in a circuit equals the voltage E divided by the impedance Z. Therefore, in either one of the primary section circuits, if the resistances and inductances are constant, then any change in the magitude of either voltage E1 or E2 will cause a corresponding change in $I_L$ or $I_R$, respectively. As previously pointed out, the voltage induced in the secondary 28 varies with the magnitude of the current in the section 26L and 26R. Therefore, if the secondary is positioned over one of the taps 30 which has been selected by the contact 36 and if $I_L = I_R$, then the voltage $E_S$ induced in the secondary will be zero or have a minimum value as heretofore discussed. If $I_L$ is increased in value and is no longer equal to $I_R$, then the voltage induced in the secondary 28 by $I_L$ will be greater than the voltage induced by $I_R$ and the phase and amplitude of the voltage $E_S$ will reflect the increase of the current $I_L$. The above is shown vectorially in FIG. 6 wherein the arrows $V_L$, $V_R$ indicate the voltages induced in the secondary 28 by the sections 26L and 26R, respectively, and the vector $E_S$ indicates the secondary voltage which is the resultant of the voltages $V_L$ and $V_R$. If the resistances of the two sections of the primary circuit are adjusted to be slightly unequal, then a minimum voltage $E_S$ will be present. If then the value of the voltage $V_L$ is increased, as shown by the dotted arrow $V_{L2}$, then the resultant voltage $E_{S1}$ will have its magnitude and phase angle changed. When the secondary is displaced from its centered position over the selected tap 30 toward terminal 42R, a greater area of the secondary will be coupled to be affected by the current $I_R$ and the effect on the voltage $E_S$ by changing the current $I_L$ can thus be minimized. Conversely, if the current $I_L$ is decreased relative to the current $I_R$, then the secondary 28 will have to be displaced toward terminal 42L to minimize the effect on the voltage $E_S$ of the change of the current $I_L$. In other words, if the value of the current $I_L$ is changed in discreet steps, a plurality of predetermined spaced balance points in the space between the spaced taps 30 can be detected.

The circuit arrangement for changing the current on $I_L$ in discreet steps is shown in FIG. 5. As previously indicated, the means comprising the lumped inductors 44 and 46 are connected at the ends of the primary coil 26 and the respective sources to maintain the inductance of the circuits including the primary sections 26L and 26R equal as the position of the tap switches 30 is changed. FIG. 5 illustrates a means which comprises transformers T1, T2 and T3 which may be connected between the source 38 and the means including the lumped inductance 44. The transformers T1, T2 and T3 are precision ratio transformers which will permit moving of the balance point in .001″, .01″ or .1″ steps respectively. A transformer T4 has a secondary winding T4S connected to serve as a source 38 as previously described and a primary winding T4P connected to a suitable source of single phase alternating current. The transformer T3 has a primary winding T3P connected to the source which supplies the primary T4P and has a tapped secondary winding T3S taped to divide the voltage induced in the secondary T3S into nine equal components. The taps on the transformer secondary T3S are connected to the stationary contacts 0–9 of a selector switch 66. The transformer T2 has a primary winding T2P connected across the 0–1 tap of the transformer secondary T3S. The transformer T2 has a secondary winding T2S which is tapped to provide nine equal sections. The taps on the transformer secondary T2S are connected to the stationary contacts 0–9 of a selector switch 68 which has a movable contact arranged so any one of the taps of the transformer taps 0–9 of the transformer secondary T2S may be selected. The transformer T1 has a primary T1P connected to be energized by the 0–1 section of the transformer secondary T2S. The transformer T1 has a secondary winding T1S which is tapped to provide ten equal sections; however, only nine of the taps of the transformer secondary T1S are connected to the stationary contacts 0–9 of a selector switch 70 which has a movable contact arranged to select any one of the 0–9 taps of the transformer T1. The transformer T2 and T3 secondary and primary windings are arranged so the voltage across any one of the sections equals 1/10 of the voltage across the respective primaries. For example, if the primary T3P is energized with 100 volts, then each of the sections of the secondary, i.e., 0–9, will have 10 volts therebetween, and the 10 volts across sections 0–1 of the transformer secondary T3S will be impressed across the transformer primary T2P. When 10 volts is impressed on the transformer T2P, one volt will exist across any one of the sections 0–9 of transformer secondary T2S. The transformer primary T1P is energized across the section 0–1 of transformer secondary T2S. The primary secondary ratio of transformer T1 is a one-to-one ratio and the transformer is provided with ten taps, nine of which are connected as shown to the stationary contacts of a selector switch 70. The remaining section, which is indicated by the numeral 71, is connected so it will be in circuit with any one of the 0–9 taps of the transformer secondary T1S.

The movable contact of the switch 66 is connected to the stationary contact 9 of the selector switch 68. The movable contact of switch 68 is connected to the end terminal 10 of the transformer secondary T1S so the section 71 will be in circuit with any one of the contacts 0–9 of the selector switch 70. The movable contact of selector switch 70 in turn is connected through the resistor R1 to the inductor 44, as shown and as previously described. The secondaries T1S, T2S, T3S and T4S are all wound relative to their primary coils so that at any one instant the ends indicated by the dots D will have the same polarity. With the above in mind, the operation of the precision ratio transformers T1, T2 and T3 in the circuit will be described.

It is clearly apparent that rotating any one of the contacts of selector switches 66, 68 and 70 in a clockwise direction will cause an increase in the voltage $E_L$ which corresponds to a shift to the left of the balance point of the position indicating system including the primary sections 26L and 26R and the secondary 28 as previously described. Thus, if the movable contacts of selector switches 66, 68 and 70 are each positioned to contact the stationary contacts 9 of the respective switches, then secondary T3S will supply 90 volts, secondary T2S will supply 9 volts and secondary T1S will supply one volt so the potential between terminal 42L and the tap 30 will equal 100 volts which equals the potential of 100 volts impressed between tap 42R and tap 30 supplied by the transformer T4S.

If all of the selector switches 66, 68 and 70 have their movable contacts rotated counterclockwise so as to be in contact with the stationary contacts marked zero of the respective switches, then the transformer T3S will furnish zero volts, transformer T2S will furnish zero volts, and the transformer T1S will furnish only the voltage appearing across the section 71 or 1/10 of a volt to the section 26L and the secondary 28 will have to be displaced to the left to provide the predetermined null voltage output. From the above it is clear that the transformer arrangement, including transformers T1, T2 and T3 permits division of the voltage across the section 26L into 999 discreet steps. Thus the method of ratioing the voltage between 26L and 26R will permit the one inch intervals between the taps 30 to be divided into 999 parts or permit positioning to .001 of an inch, which feature is employed in the position control or positioning apparatus of any invention.

In FIG. 7 a phase discriminating circuit, which is independent of line voltage changes and responsive to the signal voltage $E_S$, from the secondary 28, is shown. In FIG. 7 the secondary 28 and the capacitor 62 are shown. These have been previously described. Connected in a series circuit across the secondary 28 are an amplifier 80, an operating coil of a voltage sensitive relay 82, and an initiating switch 84. A source of alternating current, not shown, is connected to a pair of input leads 86 and 88. These leads are connected through a suitable voltage regulator 90 which may consist of a regulating transformer, a voltage regulating tube network and the like. The output leads of the voltage regulator 70 are connected through a suitable half wave rectifier such as a diode 92 to a parallel connected resistor 94 and a capacitor 96. The above circuit will charge the capacitor 96 to the polarity indicated. The positive terminal of the capacitor is connected through a pair of normally closed switch contacts 98 and the operating coil of a relay 100 to the anode 102 of an electronic switch 104, such as a gas filled thyratron tube which has a cathode 106 and a pair of control electrodes consisting of a grid 108 and a shield grid 110. The cathode 106 is connected by a lead 112 to the negative side of the capacitor 96.

The output signal of the position indicating system provided by the secondary coil 28 and tuned capacitor 62 has a sinusoidal voltage wave as indicated by wave shape 114 which will vary in phase depending on the position of the secondary 28 relative to a selected one of the taps 30. This sinusoidal voltage signal is impressed as an input to an amplifier and a wave squarer which is indicated by the numeral 113 which amplifies the signal from the secondary 28 and changes the sinusoidal wave form without changing the phase thereof so the voltage signal voltage wave will have substantially the shape indicated by the wave form 116. The voltage signal represented by wave form 116 is impressed as an input to a differentiator 118 which modifies the wave form 116 without changing the phase thereof so the changes in polarity of the voltages of wave 116 will appear as sharp spikes at the instants when the polarity of the wave form 116 reverses. The output of the differentiator 118 having the wave form 120 is impressed on the grid 108. To accomplish the above, one of the output terminals 40 of the secondary coil 28 is connected through the amplifier and wave squarer 113 and through the differentiator 118 to the grid 108. The other terminal 40 is connected through a lead 122 and a bias source 124 to the cathode 106. The bias source 124, which is shown as a battery, is connected to bias the cathode 106 positive relative to the grid 108 and oppose the output effect of the secondary 28 as shown in FIG. 8. A conventional phase shift network 126 comprising an input transformer 128, potentiometer resistor 130, a capacitor 132, and an output transformer having a primary winding T134P energized from leads 86 and 88.

The output transformer has a secondary winding T134S which has one of its output terminals connected through an amplifier and wave squarer 136 and a differentiator 138 to the shield grid 110 of tube 104. The other terminal of secondary T134S is connected through the bias source 124 to the cathode 106, which is arranged to constantly bias the cathode 106 positive relative to the shield grid 110 and oppose the effective voltage output of secondary T134S as shown in FIG. 8. The amplifier and wave squarer 136 and the differentiator 138 are similar to the amplifier and wave squarer 113 and the differentiator 118 and will modify the sine wave output of the secondary T134S without changing the phase thereof as heretofore described.

The operation of the circuit shown in FIG. 7 will now be described in terms of FIG. 8. The capacitor 96 applies a constant unidirectional potential to the anode and cathode of the thyratron tube 104. The conduction of the tube 104 is controlled by the grid 108 and the shield grid 110. Both the grid 108 and shield grid 110 are normally biased by the source 124 to maintain the tube 104 nonconducting. When the tube 104 is conducting, the grid 108 and shield grid 110 lose control and the conduction of the tube 104 ceases only when the switch contacts 98 are opened. Superimposed on the voltage of the bias source 124 in opposition thereto as shown in FIG. 8, the secondary 28 supplies a spiked voltage signal because of the amplifier and wave squarer 112 and the differentiator 118. Concurrently, but not necessarily in phase with the potential impressed on the grid 108 by the secondary 28, the phase shift network 126 through the amplifier and wave squarer 136 and the differentiator 138 supplies a series of voltage spikes to the shield grid 110. The above is shown as the grid signal and shield grid signal in FIG. 8. The parameters of the circuit are selected so that neither the positive signal from the shield grid 110 nor the positive signal to the grid 108 will render the tube 104 conductive. The positive grid signal is required to coincide with the positive shield grid signal before the tube 104 conducts. As previously indicated, movement of the secondary 28 relative to the selected tap 30 of the primary coil 26 will cause a change in the phase of the voltage induced in the secondary 28. Therefore, as the secondary 28 is moved into position relative to the selected tap 30, the phase of the grid signal will change and at a predetermined location of the secondary 28 relative to the primary 26, the grid signal and the shield grid signal will coincide to render the tube 104 conductive. For the purpose of convenience, the wave of the voltage driving the primary coil is shown by the dotted line in FIG. 8. The resistor 130 is arranged in the phase shift network 126 to vary the phase of the voltage output of secondary winding T134S. This will cause the phase of the shield grid signal to be correspondingly varied, and thus require the phase of the grid signal to be correspondingly varied before tube 104 conducts. This is equivalent to a shift in the null position of the secondary 28 relative to the selected tap 30 on the primary 28. Thus, if the part which is to be operated upon by the machine on which the primary and secondary are mounted is displaced slightly from its properly centered position, the position indicating system may be readily adjusted to compensate for the part displacement.

With the foregoing description relative to FIGS. 7 and 8 in mind, the operation of the circuit shown in FIG. 7 will now be described. Assume that the selector switch 35 has been moved to select a tap 30 on the primary which will require repositioning of the secondary. When this occurs, a voltage of relatively great magnitude will be induced in the secondary 28, the phase of which will depend upon the direction of the displacement of the secondary relative to the selected tap 30. In other words, if the secondary is positioned so that the current flow through section 26L predominates, then a voltage having the phase of the voltage across 26L will be induced in the secondary. This voltage is amplified by the amplifier 80 to cause the voltage sensitive relay 82 to be energized and move the armature 140 of relay 82 thereby completing a circuit through the contact 140a. The contact 140a may be connected into a suitable motor control circuit, not shown, which is phase discriminative of the voltage induced in the secondary 28 and which will energize a motor, not shown, to move the secondary toward the tap 30 which has been selected. The armature 140 is mechanically connected as shown by the dotted line 142 with the switch contacts 98. When the armature 140 moves to close the switch contacts 140a the switch contacts 98 will be moved to the open position, cutting off thyratron tube 104 conduction. As the secondary 28 moves toward the selected tap 30, the magnitude of the voltage induced therein will decrease. As heretofore stated, relay 82 is selected to be voltage sensitive and after the magnitude of the voltage of the secondary has decreased sufficiently, the relay 82 will become de-energized permitting the armature 140 to close the switch contacts 98 and open the switch contacts 140a. If desired, the opening of switch contacts 140a and the nonconduction of the thyratron tube 104 can be used in the motor control circuit, not shown, to cause the motor which causes relative movement of the primary and secondary to continue to rotate at a reduced rate until the phase angle of the signal to grid 108 coincides with the phase angle of the shield grid 110 signal to cause the tube 104 to conduct and energize the relay 100. The relay 100 has a pair of conventional switch contacts which can be used to control the motor control circuit, not shown, to de-energize the motor and energize a suitable means, such as a brake, to clamp the machine so the secondary 28 and primary 26 are maintained in the position selected by the position indicating system according to the present invention. It is clearly apparent that the brake and motor control circuits as used with the circuit shown in FIG. 7 are unimportant insofar as the present invention is concerned, as these are conventional and are mentioned herein for illustrative purposes only as will be apparent from the description of FIG. 9. It has been determined that an appreciable change in both the magnitude and phase of the voltage induced in the secondary 28 occurs over a limited range at the positioning point of the primary 26. While this phenomenon is important and contributes to the accuracy of the position indicating system according to the present invention, it limits the speed at which the machine to which the primary 26 and secondary 28 are attached may traverse, if hunting of the control system is to be avoided as the final position point is approached by the secondary 28. The arrangement shown in FIG. 9 will overcome this difficulty.

In FIG. 9 of the drawings, a quick slow down circuit is shown wherein the numeral 28 indicates the main secondary coil and the numeral 26 indicates the primary coil as heretofore described. In this embodiment a plurality of additional separate individual secondary coils 28al, 28bl, 28ar, 28br, are shown as mounted on a common support 144 in fixed, predetermined, accurately spaced positions relative to one another. The output leads of the several secondaries 28al, 28bl, 28, 28br and 28ar are each connected through duplicates of the phase discriminating circuits as shown in FIG. 7, which in FIG. 9 are designated by numerals 201, 202, 203, 204, 205. The outputs of the phase discriminating circuits 201–205 in turn are connected to supply an input to a suitable motor control 206 which is discriminative of the phase of the voltage output of the respective secondaries 28bl, 28al, 28, 28ar, and 28br. The control 206, which may be of the type disclosed in the United States patent to Schurr, 2,564,284, in response to the signals from the secondaries 28bl, 28al, 28, 28ar and 28br, as well as the circuits 201–205, will control both the direction and speed of a motor 207 which is suitably mechanically connected to move the common support 144 for the secondary windings relative to the primary winding 26. In the embodiment shown, a rack 208 and a pinion 209 driven by the motor 207 provides one type of mechanical connection which may be employed. The input to the primary coil 26 is provided by a control 210 which is fully disclosed in FIG. 5. The arrangement shown in FIG. 9 will cause the motor 207, which actuates the drive means, to operate at a high speed when the secondary 28 is remotely located from its final selected position. When the secondary 28 approaches its final selected position, the control in FIG. 9 will cause the motor 207 to operate at a reduced speed so that rapid and accurate positioning control is accomplished. It is clearly apparent that if the final set point on the primary 26 as adjusted by the control 210 is located to the left of the secondaries 28, 28al, 28bl, 28br, and 28ar, and if the motor 207 moves the secondaries to the left relative to the primary, then as the final position point is approached, the secondary 28al will be the first to receive a signal. The signal generated in the secondary 28al is transmitted by the circuit 201 to the motor control circuit 206 to cause a reduction in the speed of motor 207. Further leftward movement toward the final position point will cause the secondary 28bl to receive a signal which signal is transmitted to the motor control circuit 206 by circuit 202 to cause a further reduction in the speed of motor 207 or, if desired, will cause the motor 207 to be de-energized to permit the apparatus to creep or coast toward its final position. When the final position point is reached, which is detected by the main secondary 28, a signal is transmitted by secondary 28 through the circuit 203 to the motor control circuit 206 to cause the motor 207 to be completely de-energized and if desired, to have a suitable braking means applied so the relative position between the primary and secondary is maintained. It is clearly also apparent that if a point on the primary 26 to the right of the secondary is located, then the secondaries 28ar, 28br and 28 will sequentially receive the signals to cause the reverse of above sequence of motor operation to occur.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. An electric positioning indicating apparatus, comprising: an elongated primary winding having a pair of spaced primary terminals, an alternating current source, at least one tap on the primary winding located between the primary terminals, said tap and primary terminals thereby dividing the primary winding into at least two sections each section having a predetermined inductance and resistance ratio, means connecting the tap and primary terminals to said source so the current flow from said source to the sections through the tap equals the sum of the current flow through said sections, a secondary winding inductively coupled to the primary winding and axially movable relative to said sections and having a pair of output terminals, said secondary winding having an alternating voltage induced therein, the potential and phase of which will depend on the position of the secondary winding relative to the tap on the primary winding, an impedance including an inductance element included in the means connecting the primary terminals to said source for maintaining the voltages induced in the secondary by said sections symmetrical when said secondary is in a predetermined position relative to the tap, and means connected to the output terminals and responsive to phase of the alternating voltage induced in the secondary winding.

2. The combination as recited in claim 1 wherein a capacitor is connected across the terminals of the secondary to provide a parallel tank circuit.

3. The combination as recited in claim 1 wherein the inductance which varies the inductance-resistance ratio of the sections of the primary is adjustable.

4. The combination as recited in claim 1 wherein a pair of alternating single phase circuits are connected respectively through variable inductances so the sections of the primary are energized by separate sources and the tap on the primary is common to both sources.

5. The combination as recited in claim 1 wherein the primary coil has a plurality of taps spaced at predetermined intervals.

6. The combination as recited in claim 1 wherein at least one additional secondary coil is positioned a predetermined distance from the secondary coil recited in claim 1 and wherein both of said secondary coils are mounted on a common support and are inductively coupled to the primary coil and wherein a separate means is provided which is responsive to the output of the second secondary coil winding.

7. The combination as recited in claim 1 wherein the means connected to the output terminals of the secondary coil includes an electronic switch means having a pair of control elements one of which is connected to the secondary and the other of which is connected to the output of an adjustable phase shift network.

8. The combination as recited in claim 1 wherein the means connecting the primary terminals and the tap includes a means for selectively varying the voltage impressed across one of the sections in discreet steps.

9. An electric positioning apparatus, comprising: a primary winding having a terminal at each end, at least one tap on said primary winding unequally spaced between said end taps thereby dividing the primary winding into a pair of sections of unequal impedance, a single phase alternating current source having at least a pair of terminals of opposite polarity, means connecting the tap to one of the terminals of the source, means connecting the end terminals of the primary winding to the source so each terminal will be of like polarity and have a polarity opposite to the polarity of the tap, a secondary winding inductively coupled to the primary winding and movable relative thereto and having a pair of output terminals, said secondary winding having an alternating current induced therein the potential and phase of which will depend on the relative position of the secondary winding relative to the tap on the primary winding, an impedance means including an inductance element included in the means connecting the end terminals of the primary winding to the source for equalizing the impedance of the sections of the primary winding whereby the voltages induced in the secondary by said sections will be symmetrical when said secondary is in a predetermined position relative to the tap, and means connected to the terminals of the secondary for detecting the phase and magnitude of the voltages induced in the secondary.

10. The combination as recited in claim 9 wherein the means connecting the end terminals of the primary winding to the source in addition to the equalizing impedance means includes a means for varying the magnitude of the voltage across one of the sections of the primary winding relative to the other.

11. The combination as recited in claim 9 wherein the primary winding is provided with a plurality of selectable taps dividing the primary into a plurality of pairs of selectable sections and the impedance means comprises a pair of variable inductance elements each of which is connected in circuit with an end terminal of the primary winding for maintaining the impedance of the selectable sections equal regardless of which one of the plurality of taps on the primary is selected.

12. The combination as recited in claim 10 wherein the means for varying the magnitude of the voltage induced in the said one section includes a plurality of tapped transformers.

13. The combination as recited in claim 10 wherein a capacitor is connected across the output of the secondary to provide a parallel tank circuit which will increase the output voltage of the secondary at the frequency of the output voltage of the secondary and will suppress the voltages of spurious frequencies induced in the secondary.

14. The combination as recited in claim 13 wherein the output of the secondary is impressed on a phase discriminating circuit which includes an electronic switching unit having a pair of control elements one of which is connected in circuit with the output terminals of the secondary and the other of which is connected to a phase shift network.

15. The combination as recited in claim 9 wherein in the primary and secondary are mounted on relatively movable parts of a machine and an additional secondary coil is provided which is inductively coupled to the primary coil and is mounted on the same machine part on which the first mentioned secondary is mounted in spaced relation to the first mentioned secondary coil and the additional secondary coil has its output terminals connected to actuate a separate means whereby as the additional secondary coil is moved to a predetermined tap on the primary winding the separate means will be actuated before said tap is detected by the first mentioned secondary coil.

16. The combination as recited in claim 15 wherein the first mentioned secondary coil has its output terminals connected to a phase sensitive means which includes an electronic switch having a pair of control elements one of which is connected in circuit with the output terminals of the secondary and the other of which is connected in circuit with the output terminals of a phase shift network, both said circuits to the control elements being arranged so the electronic switch will be actuated only when the voltage outputs of the secondary coil and the phase shift network have a predetermined phase relation to each other whereby the voltage induced in the secondary by said primary coil will be required to have a predetermined phase before said phase sensitive means will be actuated.

17. The combination as recited in claim 16 wherein the phase shift network is adjustable to vary the phase of the voltage impressed on the other control element whereby the phase of the voltage impressed by the secondary coil on the said one control electrode will similarly have to be varied before said electronic switch is actuated.

18. An electric position indicating apparatus comprising: an elongated primary winding having a pair of spaced primary terminals, a source of alternating current, at least one tap on the primary winding located between the primary terminals thereby dividing the primary winding into at least two sections each having a predetermined inductance and resistance ratio, means connecting the tap and primary terminals to the source so the current flow through the sections at said tap equals the sum of the current flow in said sections during periods when the polarity of the tap is opposite to the polarity of the primary terminals, at least one secondary winding axially movable relative to the sections and inductively coupled to the primary winding whereby an alternating potential is induced therein the magnitude and phase of which will depend on relative positions of the secondary and tap on the primary winding, a pair of output terminals on the secondary, said means connecting the tap and primary terminals including; an impedance including an inductance for equalizing the impedance of the sections of the primary winding and a means for selectively varying the magnitude of the voltages across said sections, a means connected to said output terminals to increase the output voltage of the secondary at the frequency of the voltage of said source while suppressing voltages of spurious frequencies induced therein from other sources, output means connected to the output terminals and responsive to and actuatable when the voltage induced in the secondary has a predetermined phase angle, and a means connected to said output means for selectively varying the phase angle of the voltage to which the output means responds.

19. The combination as recited in claim 18 wherein at least two spaced secondary coils are mounted on a common support and each have a voltage induced therein by the primary winding the phase of which is dependent upon the positions of the secondary windings relative to the tap.

No references cited.

JOHN F. COUCH, *Primary Examiner.*